United States Patent
Ogata et al.

(10) Patent No.: US 7,134,521 B2
(45) Date of Patent: Nov. 14, 2006

(54) SYSTEM FOR ACTIVATING PASSENGER-PROTECTING DEVICE MOUNTED ON AUTOMOTIVE VEHICLE

(75) Inventors: Yoshihisa Ogata, Chiryu (JP); Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 188 days.

(21) Appl. No.: 10/614,902

(22) Filed: Jul. 9, 2003

(65) Prior Publication Data

US 2004/0026151 A1 Feb. 12, 2004

(30) Foreign Application Priority Data

Jul. 15, 2002 (JP) .............................. 2002-205431

(51) Int. Cl.
*B60R 21/013* (2006.01)
(52) U.S. Cl. .......................... 180/282; 280/735; 701/45
(58) Field of Classification Search ................ 180/282; 280/735; 701/1, 45, 46, 47; 340/440
See application file for complete search history.

(56) References Cited

U.S. PATENT DOCUMENTS 6,038,495 A * 3/2000 Schiffmann ..................... 701/1
6,212,455 B1 * 4/2001 Weaver ........................ 701/45
6,363,306 B1 * 3/2002 Palmertz et al. ............... 701/45
6,611,784 B1   8/2003 Tobaru et al.
6,618,656 B1 * 9/2003 Kueblbeck et al. ........... 701/45
6,681,196 B1 * 1/2004 Glaser et al. ................ 702/151
6,766,875 B1 * 7/2004 Yamamoto ................... 180/282
6,832,146 B1 * 12/2004 Ogata et al. .................. 701/45

FOREIGN PATENT DOCUMENTS

JP   H04-295787   10/1992

OTHER PUBLICATIONS

Office Communication dated Jul. 28, 2006 from Japanese Patent Office for counterpart application of JP 2002-205431.

* cited by examiner

*Primary Examiner*—David R. Dunn
(74) *Attorney, Agent, or Firm*—Posz Law Group, PLC

(57) ABSTRACT

Angular velocity in a rolling action of a vehicle is detected by an angular velocity sensor, and a difference between two angular velocities detected in a short time interval is calculated. The calculated angular velocity difference is compared with a predetermined threshold value. If the angular velocity difference is larger than the threshold value, a passenger-protecting device is activated. A rolling angle of the vehicle may be calculated by integrating the detected angular velocity, and a combination of the rolling angle and the angular velocity may be compared with a predetermined threshold. If the combination exceeds the threshold, it is determined that the vehicle is rolling over and the passenger-protecting device is activated.

9 Claims, 9 Drawing Sheets

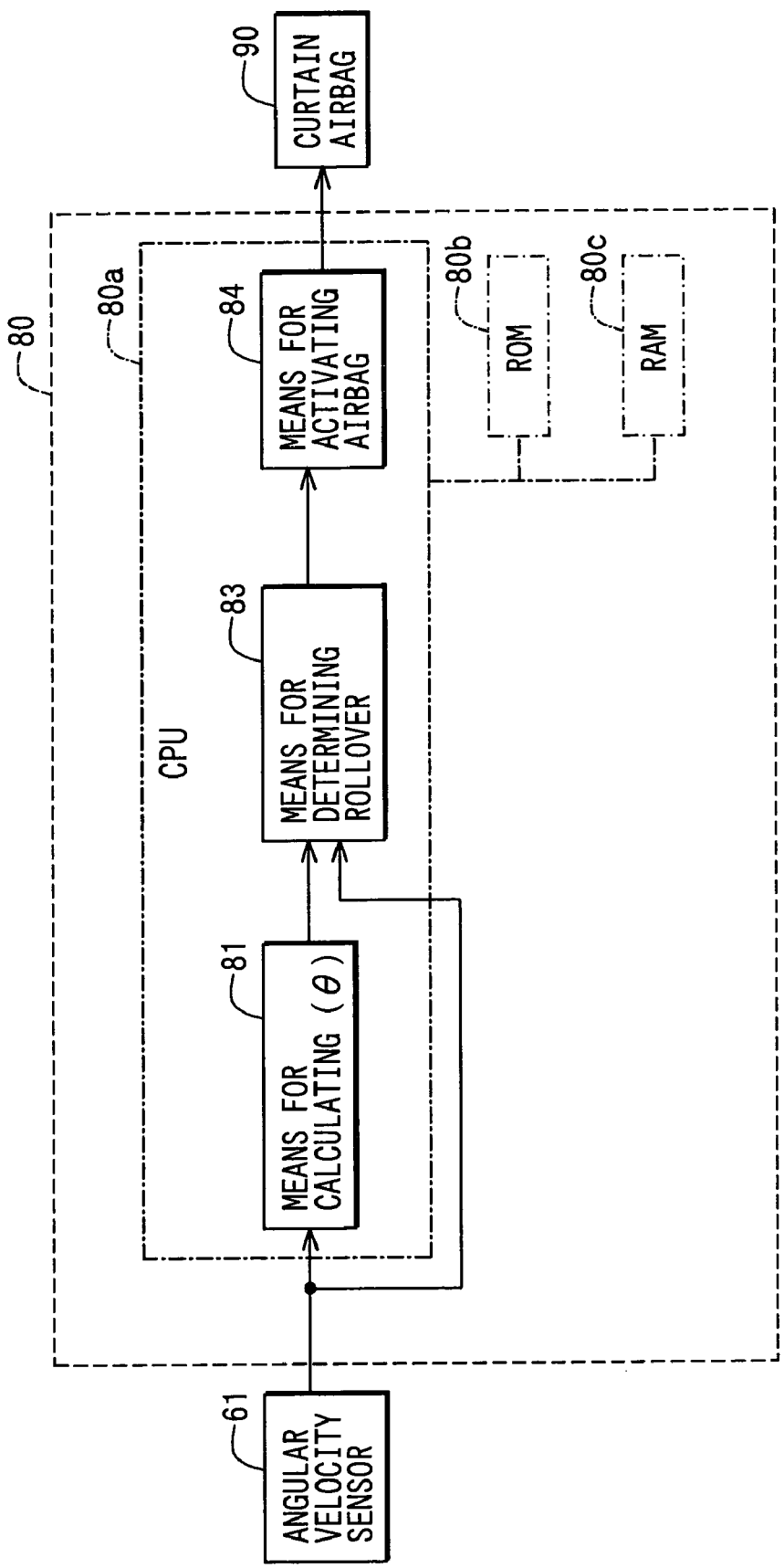

SYSTEM FOR ACTIVATING PASSENGER-PROTECTING DEVICE MOUNTED ON AUTOMOTIVE VEHICLE

CROSS-REFERENCE TO RELATED APPLICATION

This application is based upon and claims benefit of priority of Japanese Patent Application No. 2002-205431 filed on Jul. 15, 2002, the content of which is incorporated herein by reference.

BACKGROUND OF THE INVENTION

1. Field of the Invention

The present invention relates to a system for activating a passenger-protecting device such as a curtain airbag mounted on an automotive vehicle.

2. Description of Related Art

As a device for protecting passengers from a rollover of an automotive vehicle, various devices have been proposed: a curtain airbag that is inflated along a side of a vehicle, a seatbelt with a pretensioner winding the seat belt instantaneously, and a device for repeatedly winding a seat belt by a motor.

An example of conventional passenger-protecting device including a curtain airbag is shown in FIG. 10. The curtain airbag 90 is activated, i.e., inflated by an activating system 51 composed of an angular velocity sensor 61 and a control unit 80 that includes a CPU 80$a$, a ROM 80$b$ and a RAM 80$c$. An angular velocity $\omega$, when a vehicle is rolling, is detected by the angular velocity sensor 61. The detected angular velocity $\omega$ is fed to means 81 that calculates a rolling angle $\theta$ by integrating the detected angular velocity $\omega$. The detected angular velocity $\omega$ and the calculated rolling angle $\theta$ are fed to means 83 that determines that the vehicle is rolling over if both of the angular velocity $\omega$ and the rolling angle $\theta$ exceed respective predetermined levels. Means 84 activates, i.e., inflates the curtain airbag 90 when it is determined that the vehicle is rolling over.

The conventional activating system, however, is not able to quickly respond to particular situations under which a vehicle rolls over. For example, when a vehicle skids and hits a curb, the vehicle may roll over very quickly. This type of the rollover is referred to as a trip-over-type rollover. When the trip-over-type rollover occurs, passengers sitting on seats are pushed against a side of the vehicle by inertia. Under this situation, the curtain airbag may not be smoothly inflated along the side of the vehicle. In case where the seat belt with a pretensioner or the device for repeatedly winding a seat belt by a motor is used, the passengers cannot be properly protected from being thrown out of the vehicle or from colliding with structures in the vehicle, because the conventional activating system may not respond quickly enough to the trip-over-type rollover.

Another situation under which a quick response of the activating system is required is a so-called flip-over-type rollover. A rollover of a vehicle that occurs when the vehicle runs onto a sharp slope while driving at a high speed is referred to as the flip-over-type rollover. Since this type of rollover occurs instantaneously as the trip-over-type rollover does, the same problems as in the trip-over-type rollover may arise. Therefore, it is very important to detect the trip-over-type and the flip-over-type rollovers in their early stage and to quickly activate the passenger-protecting device.

SUMMARY OF THE INVENTION

The present invention has been made in view of the above-mentioned problems, and an object of the present invention is to provide an improved system for activating a passenger-protecting system in quick response to any type of vehicle rollovers. The quick response of the activating system is realized by calculating a difference between two rolling angular velocities detected within a short time interval.

A passenger-protecting device, such as a curtain airbag, a seatbelt with a pretensioner or a device for repeatedly winding a seatbelt by a motor, is activated by an activating system when the vehicle is rolling over or about to rollover. The activating system includes an angular velocity sensor for detecting a rolling angular velocity of the vehicle and an electronic control unit.

The angular velocity $\omega$ is detected by the angular velocity sensor, and a difference D between two angular velocities detected in a short time interval is calculated. The calculated difference D is compared with a predetermined value Dth. It is determined that the vehicle is rolling over if D is larger than Dth. The passenger-protecting device is activated upon such determination. In this manner, the passenger-protecting device is activated in quick response to a rapid rollover such as the trip-over-type rollover or the flip-over-type rollover.

In addition to activating the passenger-protecting device based on the angular velocity difference D, it is possible to activate the passenger-protecting device based on a combination of the angular velocity $\omega$ and a vehicle rolling angle $\theta$ that is calculated by integrating the angular velocity $\omega$. The combination of $\omega$ and $\theta$ is compared with a predetermined threshold, and it is determined that the vehicle is rolling over if the combination reaches or goes beyond the threshold. In this manner, the passenger-protecting device is quickly activated in the rapid rollover, and the relatively slow rollover is surely detected without fail.

Alternatively, the predetermined threshold, with which the combination of $\omega$ and $\theta$ is to be compared, may be changed according to the angular velocity difference D. In this case, the passenger-protecting device is not activated directly based on the angular velocity difference D. Instead, the threshold is varied in accordance with the velocity difference D. In this manner, the passenger-protecting device is activated at a proper timing irrespective of the types of the vehicle rollover, i.e., the rapid rollover or the relatively slow rollover.

According to the present invention, the passenger-protecting device can be quickly operated even when the vehicle is rapidly rolling over. Other objects and features of the present invention will become more readily apparent from a better understanding of the preferred embodiments described below with reference to the following drawings.

BRIEF DESCRIPTION OF THE DRAWINGS

FIG. 10 is a block diagram showing a conventional system for activating a curtain airbag.

DETAILED DESCRIPTION OF THE PREFERRED EMBODIMENTS

Figure 1:
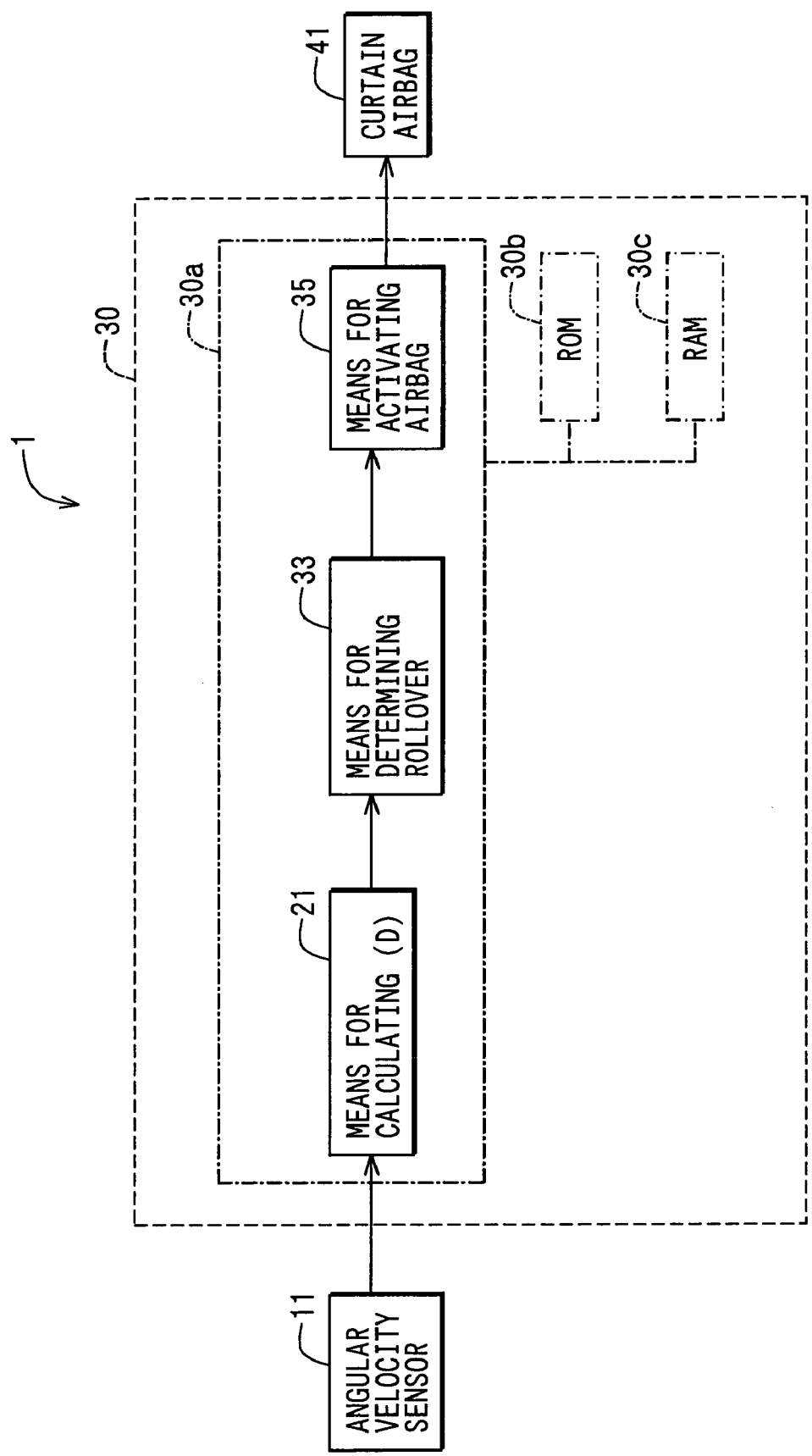
FIG. 1 is a block diagram showing a system for activating a curtain air bag, as a first embodiment of the present invention.
Figure 2:
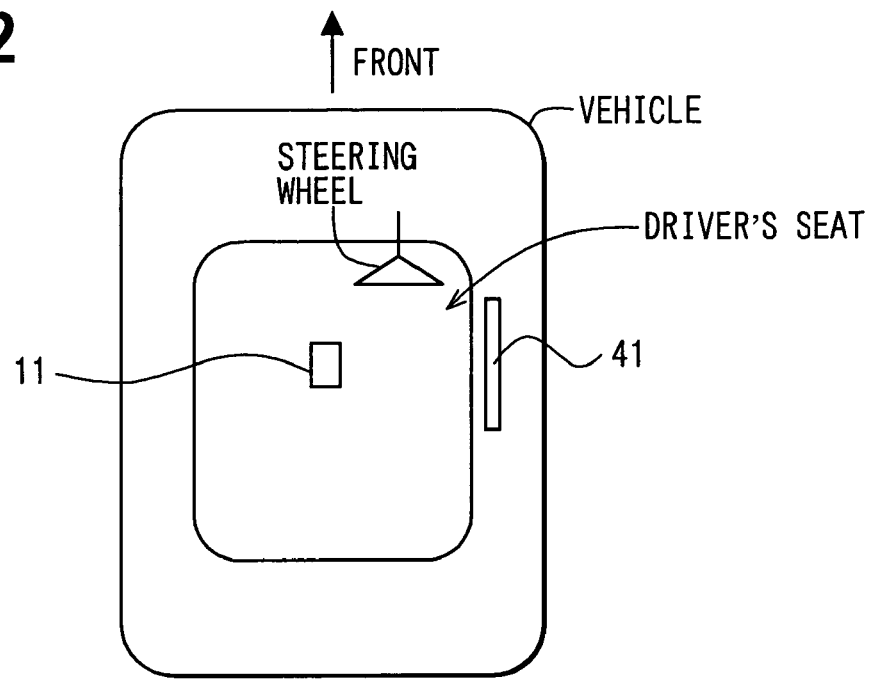
FIG. 2 is a schematic drawing showing locations of a curtain airbag and an angular velocity sensor in an automotive vehicle.
Figure 3:
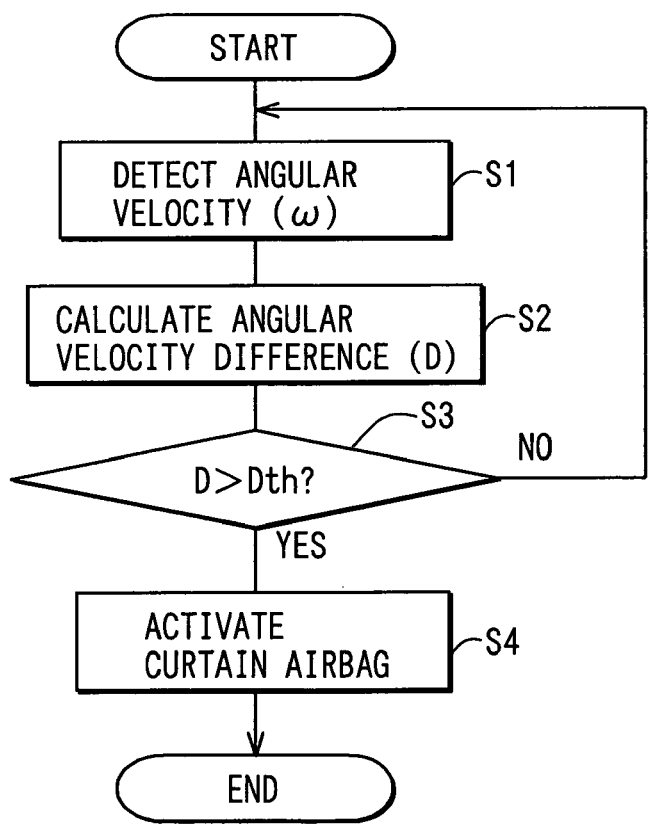
FIG. 3 is a flowchart showing a process of operating the activating system shown in FIG. 1.

A first embodiment of the present invention will be described with reference to FIGS. 1–3. As shown in FIG. 1, a system 1 for activating a curtain airbag 41 is composed of an angular velocity sensor 11 and a control unit 30. As shown in FIG. 2, the curtain airbag 41, which is one type of passenger-protecting devices, is located above a driver's side door when it is not inflated. When it is inflated, the curtain airbag 41 spreads along a side of the vehicle like a window curtain to prevent a passenger from being thrown out of the vehicle or from colliding with structures of the vehicle.

The control unit 30 includes a CPU 30a, a ROM 30b and a RAM 30c. The CPU 30a reads out a program stored in the ROM 30b, realizes respective functions of means 21, 33, 35 and performs an operating process shown in FIG. 3. The angular velocity sensor 11 positioned at a center portion of the vehicle (as shown in FIG. 2) detects an angular velocity ω in a rolling action of the vehicle. Signals representing the detected angular velocity ω are fed to the means 21 for calculating a difference D between two angular velocities detected in a predetermined short interval. As the angular velocity sensor 11, a sensor for detecting an angular velocity by means of Coriolis force may be used. The means 33 determines whether the vehicle is rolling over by comparing the calculated difference D with a threshold value Dth. If it is determined that the vehicle is rolling over, the means 35 activates the curtain airbag 41.

Now, referring to the flowchart shown in FIG. 3, the process of operating the activating system 1 will be described. At step S1, the angular velocity ω in a rolling action of the vehicle is detected. Then, at step S2, a difference D between two angular velocities detected in a predetermined short interval is calculated. The predetermined short interval is set, for example, to 25–100 ms. At step S3, whether the calculated difference D is larger than a predetermined threshold value Dth is determined. The predetermined threshold value Dth is set to a proper value based on experiments. If the calculated difference D is larger than Dth, the process proceeds to step S4, where the curtain airbag 41 is activated, i.e., inflated. Then, the process comes to the end. If it is determined that D is not larger than Dth at step S3, the process returns to step S1 and steps S1–S3 are repeated.

In the first embodiment described above, changes in the angular velocity ω are represented by the calculated difference D, and the difference D is compared with the threshold value Dth. If D is larger than Dth, the curtain airbag is inflated. In other words, when the angular velocity ω rapidly increases, it is determined that the rollover is occurring even if a rolling angle θ of the vehicle is still small. This means that the rollover of the vehicle is detected at its early stage, and the curtain airbag is activated. Therefore, when the vehicle rapidly rolls over under conditions such as the trip-over-type or the flip-over-type conditions, the passengers are properly protected by quickly activating the passenger-protecting device.

Figure 4:
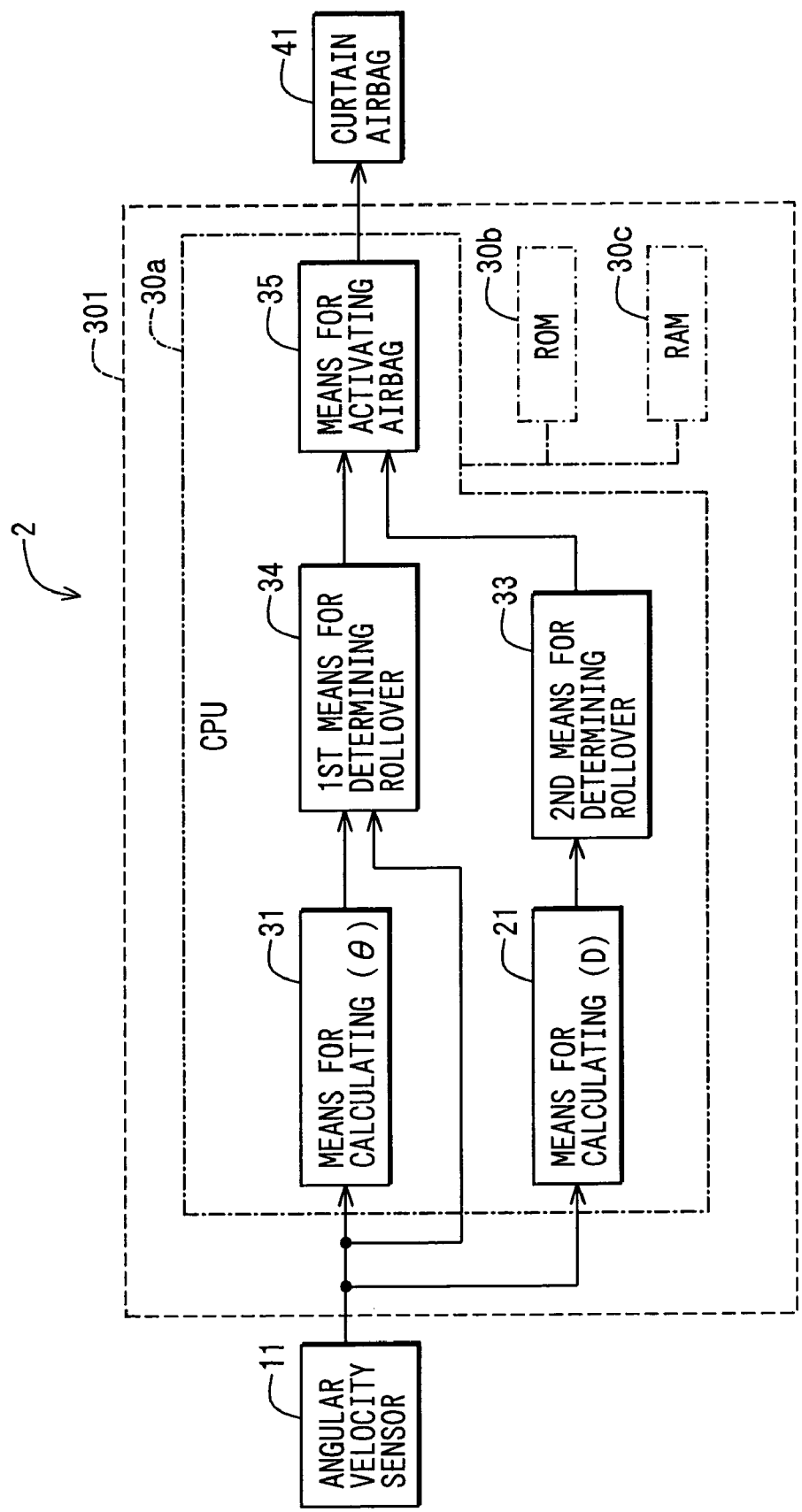
FIG. 4 is a block diagram showing a system for activating a curtain airbag, as a second embodiment of the present invention.
Figure 5:
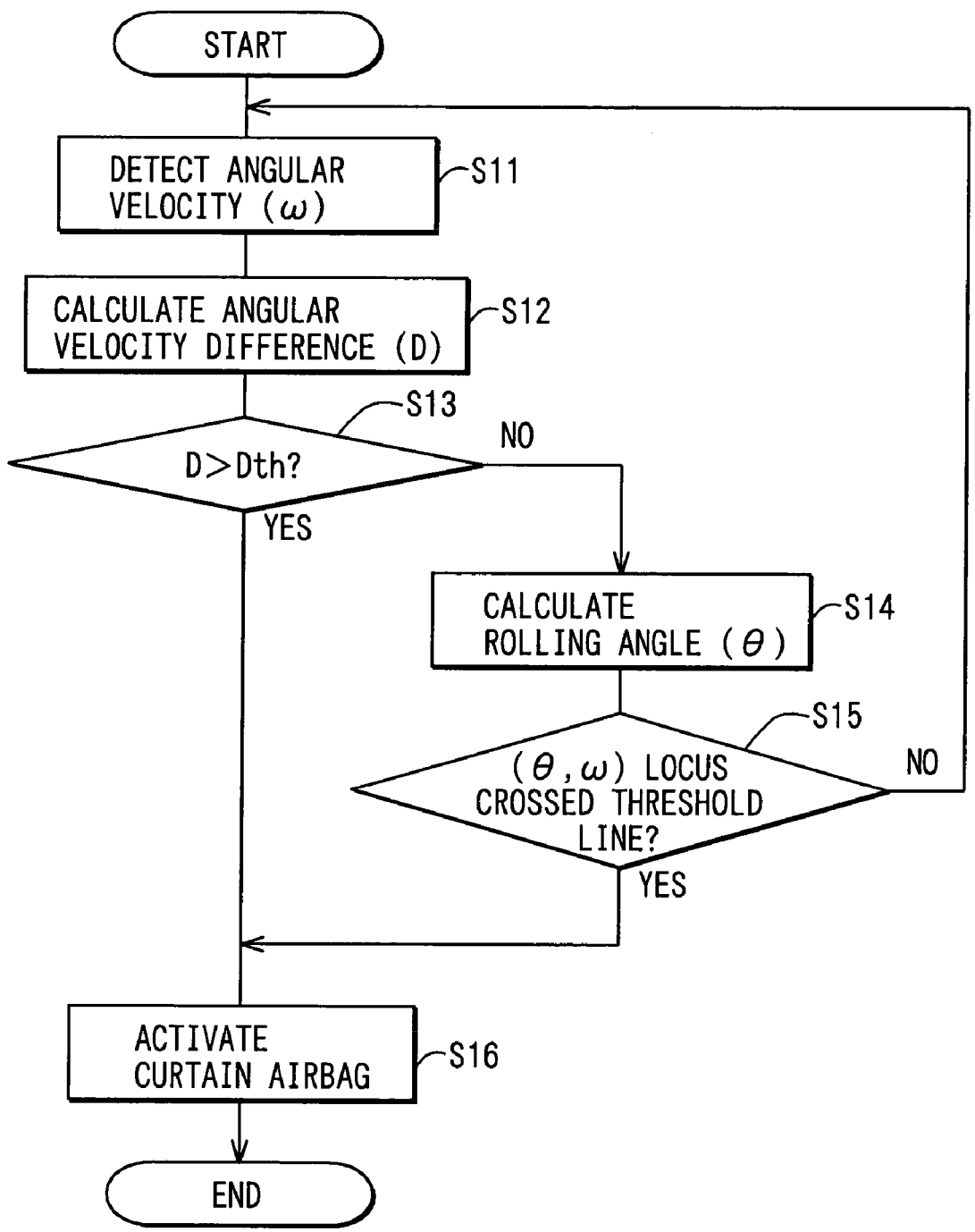
FIG. 5 is a flowchart showing a process of operating the activating system shown in FIG. 4.

A second embodiment of the present invention will be described with reference to FIGS. 4–6. The same components or means as those in the first embodiment have the same reference numbers, and detailed explanation as to those components and means are not repeated here. As shown in FIG. 4, the curtain airbag 41 is activated by an activating system 2 composed of an angular velocity sensor 11 and a control unit 301. The control unit 301 includes a CPU 30a, a ROM 30b and a RAM 30c. The CPU 30a includes means 21 for calculating D, means 31 for calculating θ, first means 34 for determining a rollover, second means 33 for determining a rollover, and means 35 for activating the curtain airbag 41. The functions of these means are realized by performing a program stored in the ROM 30b.

Referring to the flowchart shown in FIG. 5, a process of operating the activating system 2 will be described. At step S11, the angular velocity ω is detected. Then, at step S12, the difference D between two angular velocities detected in a predetermine interval is calculated. At step S13, whether the difference D is larger than the threshold value Dth is determined. If D is larger than Dth, the process proceeds to step S16 where the curtain airbag 41 is activated, and then the process comes to the end. On the other hand, if D is not larger than Dth, the process proceeds to step S14 where the rolling angle θ is calculated by integrating the detected angular velocity ω. The rolling angle θ is an angle showing an amount of roll from an initial vehicle posture when a key switch of the vehicle is turned on.

Figure 6:
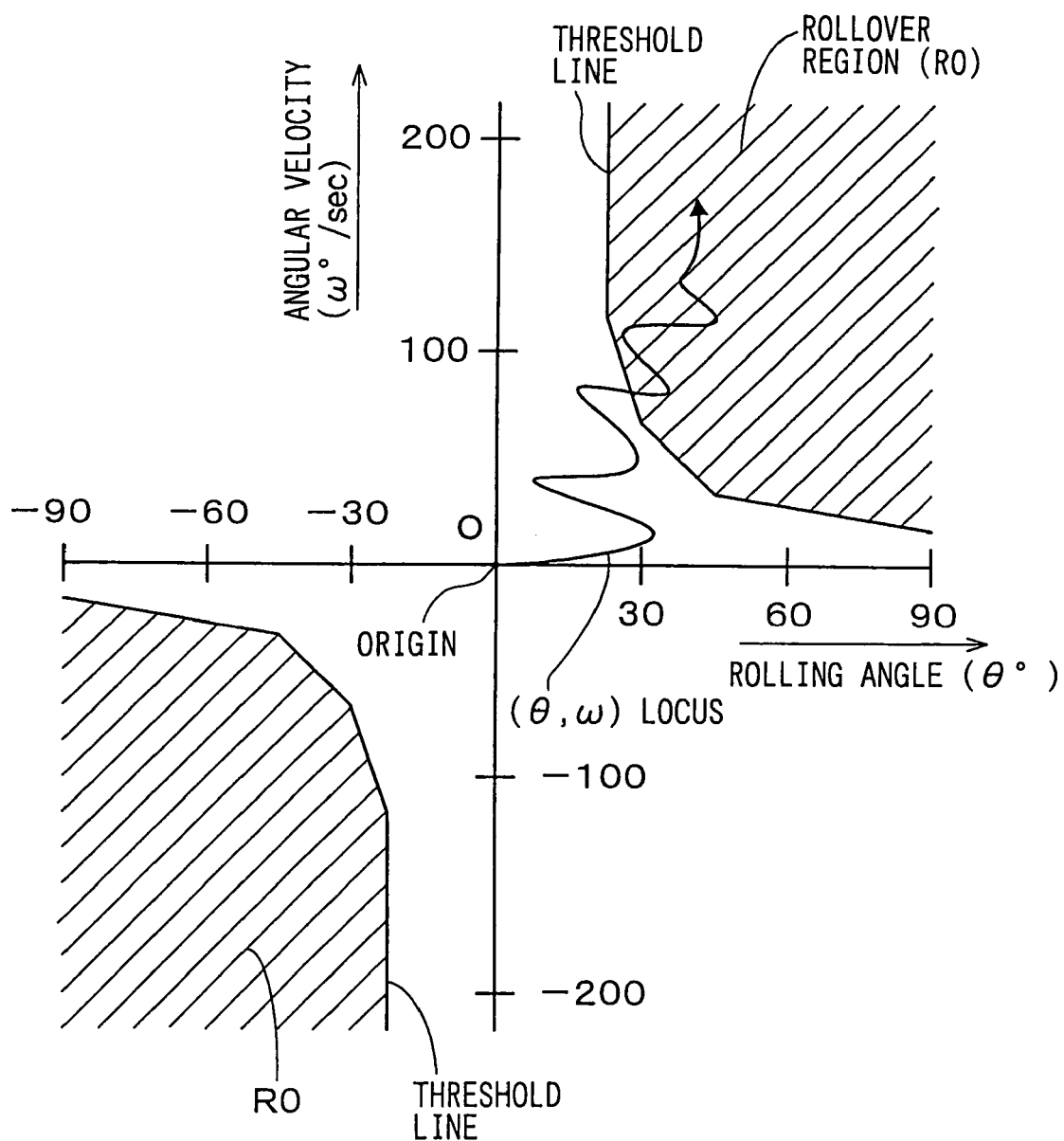
FIG. 6 is a chart showing rollover regions and threshold lines drawn on a two-dimensional coordinate having an abscissa showing a rolling angle θ thereon and an ordinate showing an angular velocity ω thereon.

On the other hand, a two-dimensional map shown in FIG. 6 is preset based on experiments and stored in the ROM 30b. The two-dimensional map is drawn on a two dimensional coordinate having an abscissa showing the rolling angle θ thereon and an ordinate showing the angular velocity ω thereon. Rollover regions RO (hatched area in FIG. 6) where the vehicle rollover occurs and threshold lines defining the rollover regions RO are drawn on the map. A locus of (θ,ω) starting from the origin of the two-dimensional coordinate is also shown in FIG. 6.

At step S15, whether the locus of (θ,ω) crossed the threshold line and entered the rollover region RO is determined. If the locus of (θ,ω) crossed the threshold line, the process proceeds to step S16 where the curtain airbag 41 is activated. If the locus of (θ,ω) does not cross the threshold line, it is determined that the rollover conditions do not exist, and the process returns to step S11 for repeating the steps S11–S15.

In the second embodiment described above, when the rapid rollover is occurring (e.g., in the case of the trip-over-type or the flip-over-type rollover), the curtain airbag is activated at an early stage of the rollover, i.e., when the rolling angle θ is still small, based on the calculated angular velocity difference D. On the other hand, when the normal (not rapid) rollover is occurring, the curtain airbag is activated based on the determination whether the locus of (θ,ω) enters into the predetermined rollover region RO. In other words, the curtain airbag is activated after the rolling angle θ and the angular velocity ω meet the rollover conditions when the normal rollover is occurring. Thus, the airbag is activated at an optimum timing regardless of the types of rollover, i.e., the rapid or the normal rollover.

Figure 7:
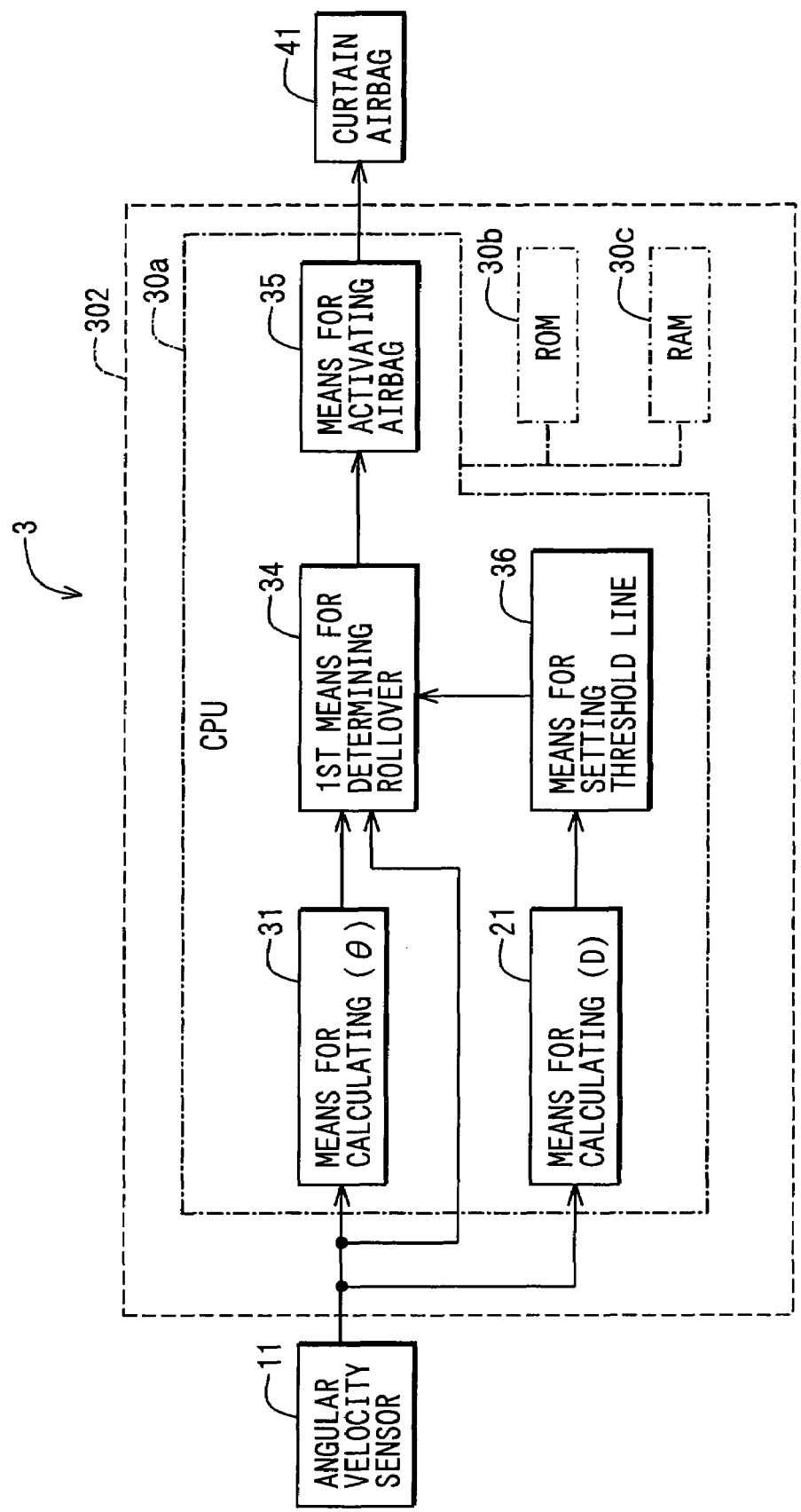
FIG. 7 is a block diagram showing a system for activating a curtain airbag, as a third embodiment of the present invention.

A third embodiment of the present invention will be described with reference to FIGS. 7–9. In FIG. 7, a system 3 for activating the curtain airbag 41 is shown. The activating system 3 is similar to the second embodiment shown in FIG. 4, except that means 36 for setting the threshold line is used in this third embodiment in place of the second means 33 for determining the rollover used in the second embodiment. The curtain airbag 41 is activated by the activating system 3 composed of the angular velocity sensor 11 and a control unit 302.

Figure 8:
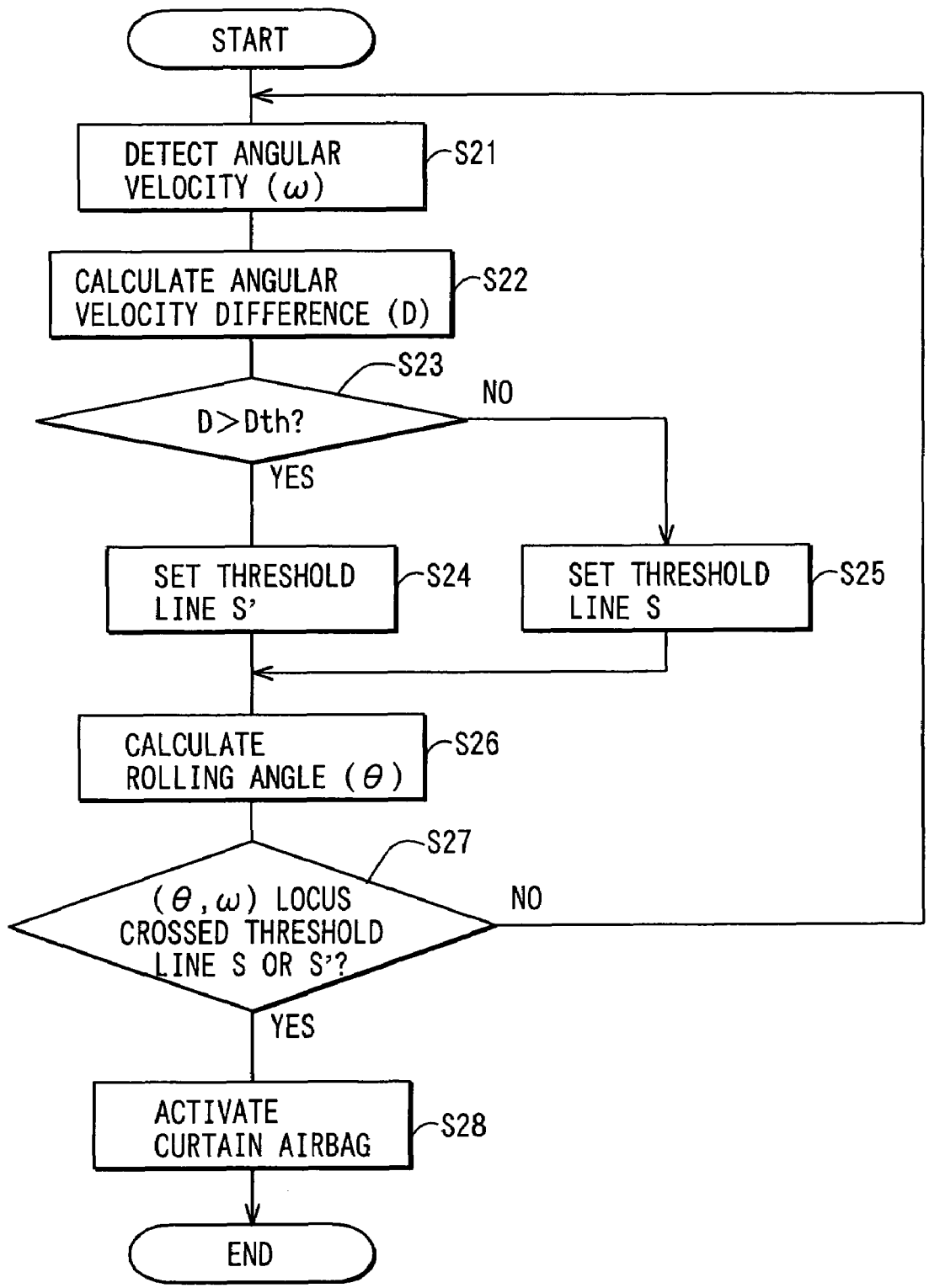
FIG. 8 is a flowchart showing a process of operating the activating system shown in FIG. 7.

Referring to FIG. 8, a process of operating the activating system 3 will be described. At step S21, the angular velocity ω is detected by the angular velocity sensor 11. At step S22, the means 21 calculates the angular velocity difference D in the same manner as in the foregoing embodiments. Then, at step S23, whether the angular velocity difference D is larger than the threshold value Dth is determined. If the angular velocity difference D is not larger than the threshold value Dth, the process proceeds to step S25. At step S25, the means 36 sets a threshold line S for the normal rollover on the two-dimensional map shown in FIG. 9. If D is larger than Dth, the process proceeds to step S24. At step S24, the means 36 sets a threshold line S' for the rapid rollover (e.g., the trip-over-type or the flip-over-type rollover), as illustrated in FIG. 9. Both of the threshold lines S and S' are stored in the RAM 30c.

Then, at step S26, the means 31 calculates the rolling angle θ by integrating the angular velocity ω detected by the angular velocity sensor 11. At step S27, whether or not the locus of (θ,ω) starting from the origin of the two-dimensional coordinate crossed the threshold line S or S' and entered into the rollover region is determined, in the same manner as in the second embodiment. If the locus of (θ,ω) does not cross the threshold line S or S', it is determined that the rollover conditions do not exist, and the process returns to step S21 for repeating steps S21–S27. If the locus of (θ,ω) crossed the threshold line S or S', it is determined that the rollover conditions exist, and the process proceeds to step S28. At step S28, the curtain airbag is activated, and the process comes to the end.

Figure 9:
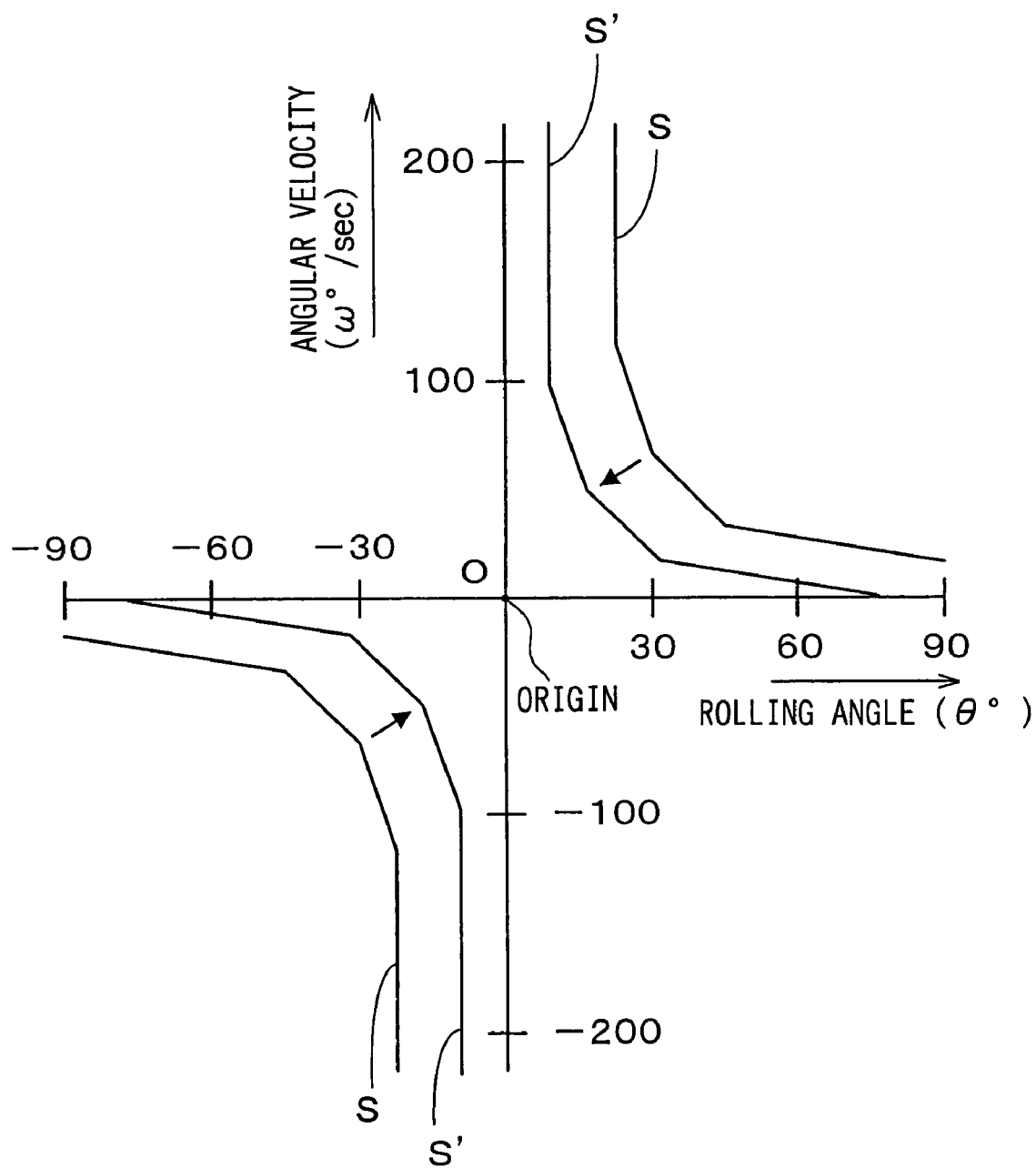
FIG. 9 is a chart showing a threshold line S for a normal rollover and a threshold line S' for a trip-over-type or a flip-over-type rollover.

In the third embodiment, the threshold line for defining the rollover region RO is set to the respective positions on the two-dimensional map according to the types of rollover, as illustrated in FIG. 9. That is, in the case where the vehicle is rapidly rolling over (e.g., the trip-over-type or the flip-over-type rollover), the threshold line S' is set to a position closer to the origin of the two-dimensional coordinate. On the other hand, in the case where the vehicle is relatively slowly rolling over (the normal rollover), the threshold line S is set to a position remoter from the origin. Therefore, the airbag can be inflated at an early stage of the rollover in the rapid rollover.

The present invention is not limited to the embodiments described above, but it may be variously modified. For example, though the curtain airbag installed at the driver's side is activated in the foregoing embodiments, it is, of course, possible to activate curtain airbags installed for other passengers. The activating system of the present invention is applicable not only to the curtain airbag but also to other passenger-protecting devices, such as a seatbelt with a pretensioner or a device for repeatedly winding a seatbelt by a motor. In the second embodiment, the first determination of the rollover is made based on the locus of (θ,ω), and the second determination is made based on the angular velocity difference D. However, both of the determinations may be combined to enhance reliability of the determination.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A system for activating a passenger-protecting device mounted on an automotive vehicle according to behavior of the vehicle, the activating system comprising:
   an angular velocity sensor for detecting rolling angular velocity of the vehicle;
   means for calculating a difference between two angular velocities detected in a predetermined time interval;
   means for determining that the vehicle is rolling over when the difference between two angular velocities exceeds a predetermined value, the determining being made solely based on the difference between the two angular velocities; and
   means for activating the passenger-protecting device when the determining means determines that the vehicle is rolling over.

2. The system for activating a passenger-protecting device as in claim 1, wherein:
   the passenger-protecting device includes at least one device selected from a group consisting of a curtain airbag, a seatbelt with a pretensioner and a device for repeatedly winding a seatbelt by a motor.

3. The system for activating a passenger-protecting device as in claim 1, wherein the predetermined time interval is between 25 and 100 milliseconds.

4. A system for activating a passenger-protecting device mounted on an automotive vehicle according to behavior of the vehicle, the activating system comprising:
   an angular velocity sensor for detecting rolling angular velocity of the vehicle;
   first means for calculating a difference between two rolling angular velocity values detected in the angular velocity sensor over a predetermined time interval;
   second means for calculating a rolling angle of the vehicle based on the angular velocity detected by the angular velocity sensor;
   determining means for determining that the vehicle is rolling over, the determining being made first based on whether the difference calculated by the first means for calculating exceeds a predetermined value, and second based on the rolling angle calculated by the second determining means, if the difference does not exceed the predetermined value; and
   means for activating the passenger-protecting device when the determining means determines that the vehicle is rolling over.

5. The system for activating a passenger-protecting device as in claim 4, wherein:
   the passenger-protecting device includes at least one device selected from a group consisting of a curtain airbag, a seatbelt with a pretensioner and a device for repeatedly winding a seatbelt by a motor.

6. The system for activating a passenger-protecting device as in claim 4, wherein the predetermined time interval is between 25 and 100 milliseconds.

7. A system for activating a passenger-protecting device mounted on an automotive vehicle according to behavior of the vehicle, the activating system comprising:
- an angular velocity sensor for detecting a first rolling angular velocity of the vehicle at a first time and for detecting a second rolling angular velocity of the vehicle at a second time after the first time;
- a calculating element for determining a difference between the first and second rolling angular velocities;
- a roll detector for determining whether the vehicle is rolling over based solely on whether the difference between the first and second rolling angular velocities exceeds a predetermined value; and
- an activation element for activating the passenger-protecting device when the roll detector determines that the vehicle is rolling over.

8. The system for activating a passenger-protecting device as in claim 7, wherein the difference between the first and second times is between 25 and 100 milliseconds.

9. The system for activating a passenger-protecting device as in claim 7, wherein:
- the passenger-protecting device includes at least one device selected from a group consisting of a curtain airbag, a seatbelt with a pretensioner, and a device for repeatedly winding a seatbelt by a motor.

* * * * *